Dec. 25, 1928.

F. DOUCHET 1,696,226

PROTECTIVE SYSTEM FOR ELECTRIC CABLES

Filed April 12, 1927

Patented Dec. 25, 1928.

1,696,226

UNITED STATES PATENT OFFICE.

FLORIMOND DOUCHET, OF PARIS, FRANCE, ASSIGNOR TO FORGES & ATELIERS DE CONSTRUCTIONS ELECTRIQUES DE JEUMONT SOCIÉTÉ ANONYME, OF PARIS, FRANCE, A FRENCH JOINT-STOCK COMPANY.

PROTECTIVE SYSTEM FOR ELECTRIC CABLES.

Application filed April 12, 1927, Serial No. 183,152, and in France May 7, 1926.

This invention relates to electric cut-out or protective systems with pilot conductors.

Differential selective protective systems for cables transmitting electric power are in general based upon the following principle:—

A transformer is connected at each end of each of the conductors in the section of the power cable to be cut out upon occurrence of a fault, the secondaries of the transformers belonging to the same conductor being connected together by a pilot wire; the several pilot wires may form a low-tension pilot cable arranged externally of the power transmission cable. The transformer secondaries connected to the same pilot wire tend to circulate currents of opposite direction therein.

When the power cable section considered is undamaged, the intensities of the currents circulating in the conductors of the said section are equal at the two extremities; consequently, the intensities of the currents which the secondaries of the transformers placed at the extremities of the section in question tend to create are also equal but of opposite directions, so that their resultant is nil and therefore no current circulates in the pilot wires.

In case of a fault or breakdown, the intensities of the currents at the two extremities of the section to be cut out or isolated being no longer equal, a resultant secondary current circulates in the pilot cable and therefore flows through the windings of the relays placed at the two ends or terminals of this section. At this moment the said terminal relays are actuated and the damaged section is thereby cut out or isolated.

Figure 1:
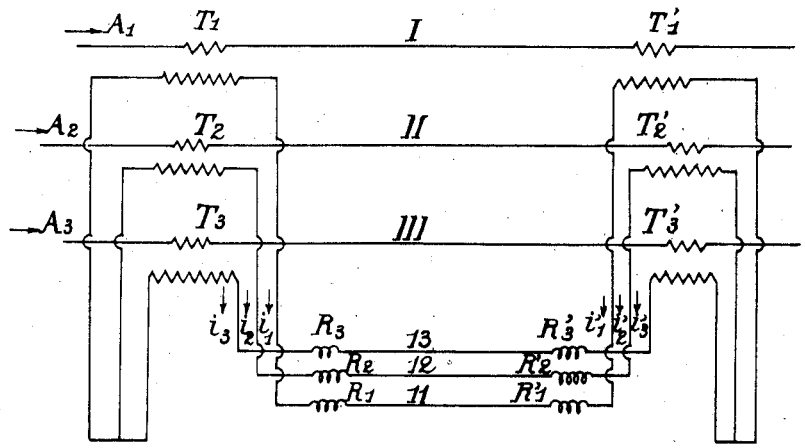

Referring to the accompanying drawings, Figure 1 represents diagrammatically an arrangement of this kind applied to an electric power transmission by three phase current. I, II and III designate the conducting cores of the power cable, while 11, 12 and 13 are the conductors of the pilot cable; $T_1$ $T_1'$—$T_2$ $T_2'$—$T_3$ $T_3'$ represent the transformers arranged respectively at the two ends of the conductors I, II and III of the power cable section considered.

The arrows $A_1$ $A_2$ $A_3$ indicate the direction of the currents flowing in the conductors I, II and III of the power cable.

The arrows $i_1$ $i_2$ $i_3$ and $i_1'$ $i_2'$ $i_3'$ indicate the direction of the currents which the transformers $T_1$ $T_2$ $T_3$ and $T_1'$ $T_2'$ $T_3'$ tend respectively to set up in the pilot cable.

$R_1$ $R_2$ $R_3$ represent the terminal relay windings connected to the pilot cable at one end of the section.

$R_1'$ $R_2'$ $R_3'$ represent the relay windings connected to the pilot cable at the opposite end of the section under consideration.

In the ordinary arrangement, on the one hand the secondaries of the transformers $T_1$ $T_2$ $T_3$ and on the other hand those of the transformers $T_1'$ $T_2'$ $T_3'$ are connected together star-wise, that is to say, the three extremities of their windings situated on the same side are connected together, the point of connection usually termed the neutral point being at the potential of the earth.

An arrangement according to the diagram represented in Figure 1 presents the advantage that the pilot cable comprises only three wires of small section.

In other arrangements, based upon the same principle, the terminal transformers are shunted by low resistances or low impedances in such a way as to provide at the two extremities under consideration an equilibrium of voltage instead of an equilibrium of current intensity.

Selective and differential cut out or protective devices of the kinds above described are well known and have been applied in a large number of installations.

Naturally, the power transmission cable to be protected may be a three-pole cable for high tension or a single-pole cable system as is used for very high tensions.

The pilot cable is always one in which there arise in normal working only low tension currents. However, in certain applications, when a fault has occurred in the power cable, it has been ascertained that the pilot cable has been damaged as if it has been subjected to a high tension of short duration.

It appears that the cause of this damage may be explained by the following considerations:

When an accident happens, for example to the conductor I of the power cable section under consideration, the said conductor is traversed during a very short period of time by a current of which the intensity is given by an equation of the form A=V/Z, where V designates the voltage with relation to earth at the moment of the fault (V might likewise designate the voltage between conductors in the case of a breakdown between the conductors), and Z is the impedance comprised between the extremity of the conductor I and the position of the fault.

Since the cables usually posses very low impedance, the current A is in general very great in high tension cables.

The current A is one which oscillates very rapidly, the value of the pulsation being determined by the electrical characteristics of the damaged power cable and of the network. It results that this current creates a magnetic flux with rapid variations in the space which surrounds the conductor I. A part of this magnetic flux traverses the circuit constituted either by a pilot wire and earth or by two pilot wires.

For unit current in the power conductor, the flux passing through the second circuit considered may be designated by M.

This coefficient M would be what is known in electro-technics as the coefficient of mutual induction, if the variations of current in the conductor I were not sufficiently great to create antagonistic fluxes and eddy currents in the surrounding metallic masses. The coefficient M may therefore not be constant but may depend on the current A and on the variation of this latter.

The circuit constituted by one pilot wire and the earth or again by two adjacent pilot wires, being traversed by an electro-magnetic flux having rapid variations of the form M A, is subjected to the action of an electromotive force of instantaneous value given by the derivative with respect to time of the preceding expression, viz:

$$e = \frac{d}{dt} M A.$$

The rapidity of the variation of the flux may be sufficiently great for this electromotive force to attain considerable magnitude and for a very high potential difference U to occur between the conductor of the pilot cable, thereby determining their breakdown or damage. The said electro-motive force may moreover not be constant along the pilot cable but may create a stationary wave of voltage.

Figure 2:
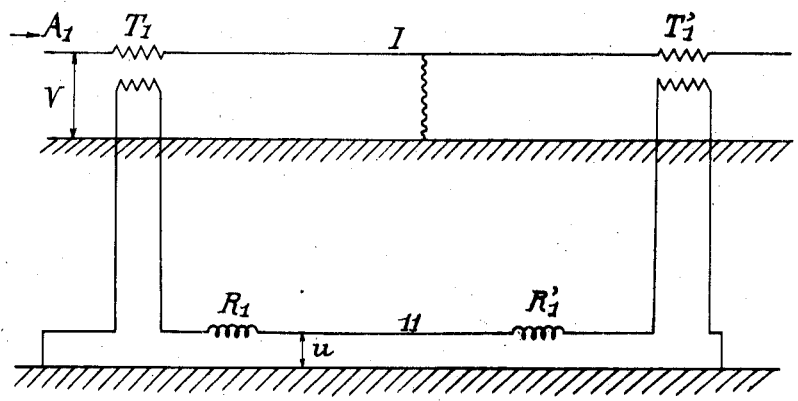

A diaphragm of this phenomenon is given in Figure 2 of the accompanying drawing, where there are represented only the elements affecting the conductor I.

The present invention has for its objects to avoid the manifestation of these high potential differences between pilot wires by electromagnetic coupling with the power cable, and thereby to suppress the cause of damage already discussed.

In order to attain these objects, it is necessary to reduce the portion passing through the pilot wires, of the flux produced by the conductor I. For this purpose it may be sought either to diminish the value of the coefficient of mutual induction at low frequency, or to increase the antagonistic fluxes at high frequencies.

The present invention has the advantage of fulfilling simultaneously both those objects by constituting the elementary circuit of the pilot cable corresponding to one phase of the power cable by means of two conductors, one of these conductors preferably surrounding the other so that the two conductors may therefore be arranged concentrically.

Figure 3:
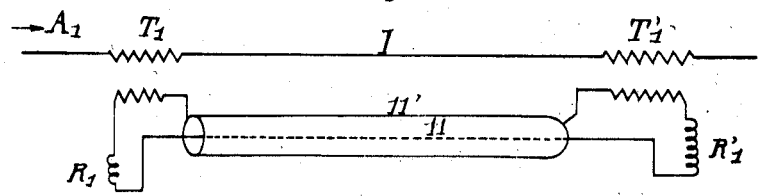

Figure 3 of the drawing represents diagrammatically by way of example a system according to the invention in its application to one phase only.

$T_1$ and $T_1'$ are the balancing transformers for the two ends of the section to be protected.

$R_1$ and $R_1'$ are the windings of the corresponding relays which may be placed at any convenient point in the pilot circuit.

11 and 11' are the concentric conductors of the pilot cable corresponding to the conductor I of the power cable; these conductors are connected in series and in their circuit there are included the secondaries of the transformers $T_1$ and $T_1'$ as well as the relay windings $R_1$ and $R_1'$.

It is quite evident that in such an arrangement the equilibrium of voltage or of current, characteristic of the differential protective system, has not been modified in its principle; but it is equally clear that the portion of the flux produced by the conductor I, which normally acts by electro-magnetic induction upon the conductor 11 in the ordinary arrangement, is considerably weakened by the presence of the conductor 11' surrounding the conductor 11.

The area between the conductors 11 and 11' embraced by the flux due to the conductor I is in fact a minimum, so that no dangerous rise of voltage in the conductor 11 with reference to the conductor 11' is to be feared.

In order to prevent a rise of voltage between the conductor 11' and earth, it suffices to fix its potential by a connection to earth or to the lead sheathing of the pilot cable.

For reasons of facility of construction, it will be clear that the two conductors 11, 11' will preferably be concentric as has already been explained. The conductor 11' may be constructed in any desired manner but must be constituted of a material which is a very good conductor of electricity, so as to increase as far as possible the antagonistic currents created in this sheath or armouring by the rapidly varying flux.

This sheath 11' may for example be formed by a metal tube or a conductor composed of metal wires arranged concentrically of the central conductor or again by a metal band or one or more metallized layers wound helically around the central conductor.

What I claim is:—

1. A protective system for electric cables, comprising a pair of transformers, said transformers having their primaries included in the circuit of one conductor of the cable to be protected, and having their secondaries connected in opposition by a pilot circuit, said pilot circuit comprising two conductors, one surrounding the other.

2. A protective system for electric cables, comprising a pair of transformers arranged at opposite ends of a section of cable to be protected, said transformers having their primaries included in the circuit of one conductor of said section of cable, and having their secondaries connected in opposition by a pilot circuit, said pilot circuit comprising two conductors, one surrounding the other for substantially the length of said section of cable.

3. A protective system for electric cables, comprising a pair of transformers, said transformers having their primaries included in the circuit of one conductor of the cable to be protected, and having their secondaries connected in opposition by a pilot circuit, said pilot circuit comprising a concentric two-wire system.

4. A protective system for electric cables, comprising a pair of transformers, said transformers having their primaries included in the circuit of one conductor of the cable to be protected, and having their secondaries connected in opposition by a pilot circuit, said pilot circuit comprising two conductors, one surrounding the other, the outer one of said conductors being of highly conductive material and forming an armouring around the inner one of said conductors.

5. In a pilot wire protective system for electric cables, the combination of a pair of balancing transformers connected to one conductor of said cable, with a two-wire pilot circuit, said pilot circuit including the secondaries of said transformers and the operating windings of the protective relays for said conductor, and the two wires of said pilot circuit being arranged concentrically for substantially the whole of their length.

6. In a pilot wire protective system for electric cables, the combination of a pair of balancing transformers connected to opposite ends of a section of conductor to be protected, relays connected to the secondaries of said transformers, said relays adapted to isolate said section of conductor, and a two-wire pilot circuit connecting said secondaries and said relays, said pilot circuit having its two wires in concentric relation for substantially the whole of their length.

7. A protective system for polyphase electric power cables, comprising a pair of transformers for each phase, said pair of transformers being connected to opposite ends of a section of conductor of said phase, and a pilot circuit for each phase, said pilot circuit including the secondaries of a pair of transformers and the windings of the protective apparatus for said conductor, each pilot circuit consisting of a two-wire system having its conductors arranged concentrically for substantially the whole of their length.

In testimony whereof I hereunto affix my signature.

FLORIMOND DOUCHET.

CERTIFICATE OF CORRECTION.

Patent No. 1,696,226.   Granted December 25, 1928, to

FLORIMOND DOUCHET.

It is hereby certified that error appears in the printed specification of the above numbered patent requiring correction as follows: Page 2, line 9, for the misspelled word "posses" read "possess"; line 49, for "conductor" read "conductors"; line 54, for "diaphragm" read "diagram"; line 73, for "those" read "these", and lines 94 and 95, strike out the word "and"; and that the said Letters Patent should be read with these corrections therein that the same may conform to the record of the case in the Patent Office.

Signed and sealed this 16th day of April, A. D. 1929.

M. J. Moore,
Acting Commissioner of Patents.

(Seal)